US008783994B2

(12) United States Patent
Müller

(10) Patent No.: US 8,783,994 B2
(45) Date of Patent: Jul. 22, 2014

(54) TRACTION ROD FOR BRACING A CRANE JIB

(75) Inventor: Thomas Müller, Rheinberg (DE)

(73) Assignee: Vallourec Deutschland GmbH, Düsseldorf (DE)

( * ) Notice: Subject to any disclaimer, the term of this patent is extended or adjusted under 35 U.S.C. 154(b) by 102 days.

(21) Appl. No.: 13/148,787

(22) PCT Filed: Feb. 5, 2010

(86) PCT No.: PCT/DE2010/000179
§ 371 (c)(1), (2), (4) Date: Oct. 18, 2011

(87) PCT Pub. No.: WO2010/091677
PCT Pub. Date: Aug. 19, 2010

(65) Prior Publication Data
US 2012/0067841 A1 Mar. 22, 2012

(30) Foreign Application Priority Data
Feb. 11, 2009 (DE) ........................ 10 2009 008 808

(51) Int. Cl.
*F16B 7/00* (2006.01)

(52) U.S. Cl.
USPC ........................ 403/294; 403/378; 403/379.3

(58) Field of Classification Search
USPC ......... 403/305, 150–152, 156, 157, 161, 158, 403/109.2, 109.6, 294, 378, 379.3
See application file for complete search history.

(56) References Cited

U.S. PATENT DOCUMENTS

| | | | | | |
|---|---|---|---|---|---|
| 1,439,045 | A | * | 12/1922 | Wilson | 74/665 T |
| 1,458,894 | A | * | 6/1923 | Schwarz | 464/88 |
| 1,947,278 | A | * | 2/1934 | Schaefer | 74/579 R |
| 2,025,146 | A | * | 12/1935 | Bannister | 72/97 |
| 2,463,883 | A | * | 3/1949 | Kinsey | 285/328 |
| 2,477,856 | A | * | 8/1949 | Benoit | 403/199 |
| 2,913,261 | A | * | 11/1959 | Matchett | 285/148.19 |
| 3,235,293 | A | * | 2/1966 | Condon | 285/233 |
| 3,709,534 | A | * | 1/1973 | Coe | 403/360 |
| 3,864,051 | A | * | 2/1975 | Reid | 403/408.1 |
| 4,193,706 | A | * | 3/1980 | Eberlein et al. | 403/19 |
| 4,269,438 | A | * | 5/1981 | Ridenour | 285/382.2 |
| 4,664,550 | A | * | 5/1987 | Jachmann et al. | 403/171 |
| 4,704,918 | A | * | 11/1987 | Orkin et al. | 74/579 R |
| 4,848,952 | A | * | 7/1989 | Strassle | 403/171 |

(Continued)

FOREIGN PATENT DOCUMENTS

| | | |
|---|---|---|
| DE | 20219281 | 4/2004 |
| DE | 202008006167 | 7/2008 |
| JP | 10194677 | 7/1998 |

*Primary Examiner* — Emmanuel M Marcelo
*Assistant Examiner* — Michael Gallion
(74) *Attorney, Agent, or Firm* — Henry M Feiereisen LLC

(57) ABSTRACT

The invention relates to a traction rod for bracing a crane jib, comprising a metallic tubular body and coupling elements which are connected to both ends thereof in an articulated connection of the traction rods among each other by means of bolts. According to the invention, the tubular body and the coupling elements can be detachably connected to each other, dispensing the need for a bonded connection, wherein the region of the connection is dimensioned in such a manner and is low on notch effects that, by calculation, the entire load capacity of the tube cross-section can be exploited with respect to a highest possible fatigue strength.

7 Claims, 2 Drawing Sheets

(56) References Cited

U.S. PATENT DOCUMENTS

| | | | | | |
|---|---|---|---|---|---|
| 4,995,832 | A * | 2/1991 | Thommen et al. | 439/578 |
| 5,184,920 | A * | 2/1993 | Strassle | 403/171 |
| 5,271,685 | A * | 12/1993 | Stark | 403/171 |
| 5,529,316 | A * | 6/1996 | Mattila | 280/93.51 |
| 5,598,738 | A * | 2/1997 | Buescher et al. | 73/761 |
| 6,386,564 | B1 * | 5/2002 | Kincad et al. | 280/93.51 |
| 6,520,709 | B1 | 2/2003 | Mosing et al. | |
| 6,612,594 | B2 * | 9/2003 | Engels et al. | 280/93.502 |
| 6,997,633 | B2 * | 2/2006 | Thomas et al. | 403/109.6 |
| 7,025,522 | B2 * | 4/2006 | Sicz et al. | 403/109.2 |
| 7,249,788 | B2 * | 7/2007 | Muhammad et al. | 285/319 |
| 7,309,085 | B2 * | 12/2007 | Westermann | 285/382.7 |
| 2002/0076273 | A1 * | 6/2002 | Carstensen | 403/305 |
| 2004/0156672 | A1 * | 8/2004 | Thomas | 403/266 |
| 2004/0208687 | A1 * | 10/2004 | Sicz et al. | 403/109.3 |
| 2008/0115622 | A1 * | 5/2008 | Uhl et al. | 74/592 |
| 2008/0157523 | A1 * | 7/2008 | Woo | 285/337 |

* cited by examiner

TRACTION ROD FOR BRACING A CRANE JIB

CROSS-REFERENCES TO RELATED APPLICATIONS

This application is the U.S. National Stage of International Application No. PCT/DE2010/000179, filed Feb. 5, 2010, which designated the United States and has been published as International Publication No. WO 2010/091677 and which claims the priority of German Patent Application, Serial No. 10 2009 008 808.3, filed Feb. 11, 2009, pursuant to 35 U.S.C. 119(a)-(d).

BACKGROUND OF THE INVENTION

The invention relates to a traction rod for bracing a crane jib.

Cranes with crane jibs are disclosed, for example, in DE 20 2008 006 167 U1. The crane jibs can hereby be braced with rope-shaped elements or with tubular elements connected with one another in an articulated manner.

It is known to construct rod-shaped elements embodied as traction rods from tube sections having forked-shaped end pieces welded to the ends as coupling elements. The individual traction rods are then coupled to one another at the fork-shaped end pieces in an articulated manner with a bolt connection to produce the required length.

Such cranes which may be constructed, for example, as lattice boom cranes are subjected during operation to high dynamic stress, which also has an effect on the traction rods of the bracing.

Disadvantageously, the weld connections between tube and coupling element of welded traction rods have an increased sensitivity to notches and are therefore at risk for increased fatigue crack formation in the region of the weld seam. The fatigue strength of such traction rods is thereby significantly reduced, increasing the risk for early failures.

It is an object of the invention to provide a traction rod for bracing a crane jib which does not have the aforedescribed disadvantages and which can be manufactured cost-effectively.

SUMMARY OF THE INVENTION

According to the teaching of the invention, a traction rod for bracing a crane jib includes a metallic tubular body and coupling elements connected to both ends of the metallic tubular body for connecting the traction rods to one another in an articulated manner with bolts. The tubular body and the coupling element can be detachably connected with one another in the absence of a material connection, wherein the region of the connection is dimensioned and is low on notch effects so that computationally the entire load capacity of the tube cross-section can be used to attain a highest possible fatigue strength.

In the first embodiment of the invention, the connection is a screw connection. The tubular body has in the connection region a wall thickening provided with a thread, which is dimensioned such that the thread in the connection region of the tubular body and the coupling element is prevented from weakening the cross-section of the nominal wall thickness of the tube by to be taken into account when computing the load capacity of the tubular body and such that the transition from the wall thickening to the tubular body is constructed to be low in notch effects.

According to another embodiment of the invention, the articulated coupling of the traction rods with one another and the connection of the tubular body with the coupling element has a common positive connection embodied as a bolt connection. The ends of the tubular body are hereby provided with an outwardly oriented wall thickening, wherein coupling elements which formfittingly abut transition regions formed as shoulders and extending from the tubular body to the wall thickening are attached on the transition regions for transmitting a pulling force, wherein the coupling element at one end is constructed as a father element and the coupling element at the other end as a mother element, wherein the father element of the one traction rod can be inserted into the mother element of the other traction rod and connected with one another in the overlap region with a bolt.

The non-positive or positive connection between tubular body and coupling element can advantageously eliminate, on one hand, a material connection produced by welding causing inhomogeneities in the material, for example metallurgical notches in the connection, which adversely affect the fatigue strength.

On the other hand, both the non-positive screw connection between tubular body and coupling elements and the positive connection attained with attachable coupling elements is advantageously implemented so as to be detachable, so that worn coupling elements can be easily and cost-effectively repaired or exchanged.

In a first advantageous variant of the method according to the invention, the wall thickening is produced by upsetting, in particular by hot upsetting of the tube end.

The upsetting process is advantageously performed so that the transitions from the tube to the coupling element produced during upsetting have the lowest possible number of notches. To this end, the transitions have the greatest possible radius. Optionally, these transitions can also be produced by mechanical machining.

The transitions formed in this way with a continuous and notch-free transition to the region of the tube that is not thickened advantageously have a low stress concentration factor in the transition zone which is advantageous for the fatigue strength of a tubular body.

According to another advantageous embodiment of the invention, the wall of the tube end can also be thickened by an overlay weld or by sintering, followed by mechanical machining.

In the aforementioned variants of the method, producing the wall thickening is completely decoupled from the rolling process; in this way, tubes, for example tubes held in inventory which were originally not intended for the described application, can be provided with a wall thickening and subjected to a corresponding mechanical machining process at a later time.

The tube ends may already be thickened during manufacture of the hot-rolled seamless tube, if this were considered to be advantageous from a production standpoint. For example, a larger outside diameter is produced by moving the rollers apart at the tube ends, while an enlarged inside diameter is produced, for example, with a suitably constructed interior tool.

Advantageous features, advantages and details of the invention are described in the following description of exemplary embodiments.

BRIEF DESCRIPTION OF THE DRAWING

It is shown in.

DETAILED DESCRIPTION OF PREFERRED EMBODIMENTS

Figure 1:
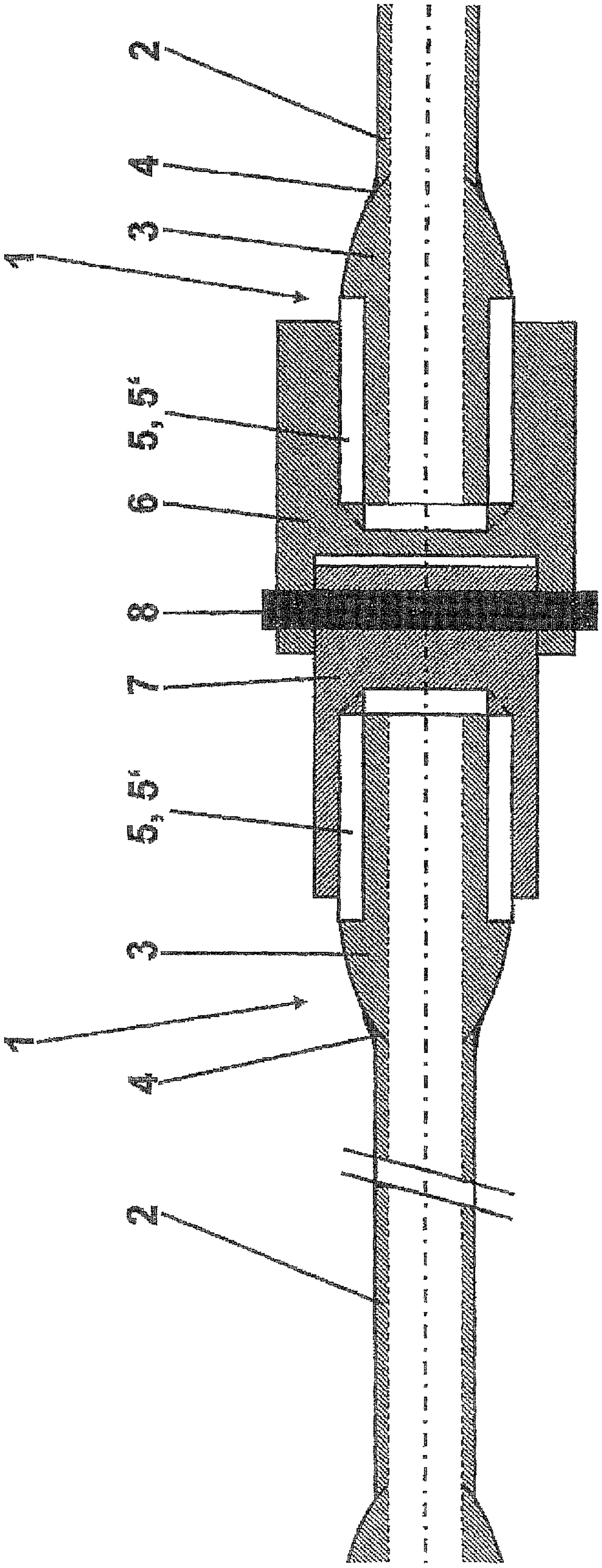
FIG. 1 a schematic diagram of a screw connection according to the invention between a tubular body and a coupling element, FIG. 2 a schematic diagram of a second embodiment according to the invention with a common positive connection between a tubular body and a coupling element and between the traction rods.

FIG. 1 shows a schematic diagram of a screw connection according to the invention between a tubular body and a coupling element.

According to the invention, the traction rod 1 is constructed from coupling elements 6 and 7 which are screwed together with a tubular body 2, wherein the ends of the coupling elements 6 and 7 can be inserted into each other for connecting the tension rods and connected in an articulated manner with a bolt 8. An unillustrated retaining ring ensures that the bolt 8 connecting the tension rods is prevented from becoming detached under operational loads.

After the coupling elements 6 and 7 are screwed together on the tubular body 2, the coupling elements 6 and 7 must be oriented and attached for installation so that the bores of the coupling elements 6 and 7 are exactly aligned to allow insertion of the bolt 8. The coupling elements 6 and 7 are then secured in this position on the tubular body 2, for example with a spot weld or a key.

The tubular body 2 has at each of its ends a wall thickening 3 with an exterior thread 5 which corresponds with an interior thread 5' disposed in the coupling element 6 and 7, respectively. According to the invention, the transitions 4 from the wall thickening 3 to the tubular body 2 are implemented without shoulders and with low notch effects so as to attain the highest possible fatigue strength of the tension rod 1 during operation.

According to the invention, the wall thickening 3 of the tubular body 2 is dimensioned so as to reliably prevent cross-sectional weakening of the nominal wall thickness of the tube caused by the thread in the connection region between tubular body 2 and coupling element 6, 7 to be taken account in the computation of the load-carrying capacity of the tubular body 2 under operational load.

Figure 2:
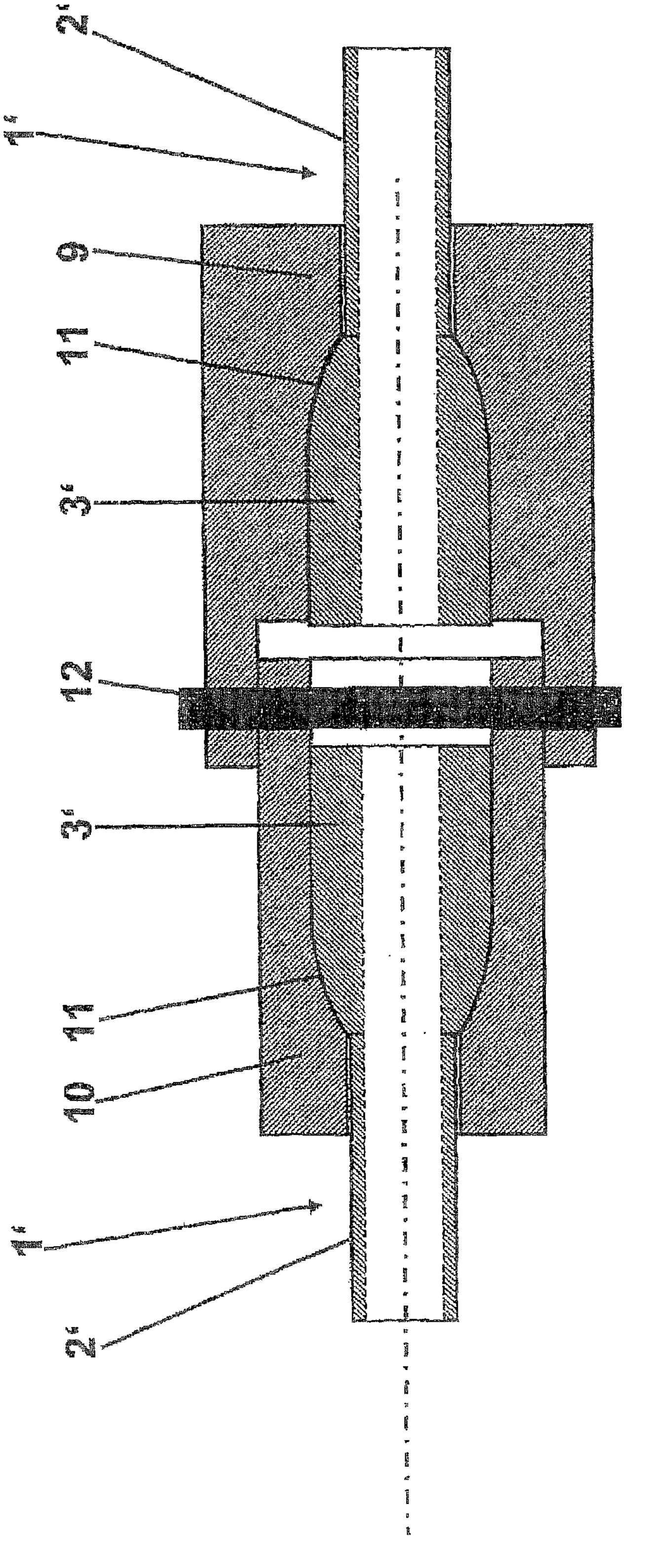

FIG. 2 shows a schematic diagram of a second embodiment of the invention with a common positive connection between the tubular body and the coupling element and between the tension rods.

According to the invention, the tension rods 1' have coupling elements 9, 10 which are each positively connected with the tubular body 2' and which can be connected with one another with a corresponding bolt 12.

For transmitting tension forces via the traction rod 1', the ends of the tubular body 2' are provided with outwardly oriented wall thickenings 3', wherein coupling elements 9, 10 which positively abut transition regions 11 formed as shoulders and extending from the tubular body 2' to the wall thickening 3' can be attached on the transition regions 11 for transmission of a tension force. According to the invention, the coupling elements 9, 10 are constructed as two shells which are symmetric with respect to the axis of the tubular body 2' for easy installation on the tube ends.

For connecting the tension rods 1' with one another, the coupling element 9 of one end is constructed as a father element and the coupling element 10 of the other end of the tension rod 1 is constructed as a mother element, which can be inserted into one another and are provided with a through bore for insertion of the bolt 12.

An unillustrated retaining ring prevents the bolt 12 which connects the tension rods with one another from disengaging under operational load.

The invention claimed is:

1. An articulated connection of a first traction rod to a second traction rod for bracing a crane jib, each of the first and second traction rods comprising:

a metallic tubular body having a longitudinal extent and a tube cross-section and at least one end with a wall thickening, wherein an outside diameter of the wall thickening is greater than an outside diameter of the tube cross section and a transition region from the tubular body to the wall thickening is unitary and constructed to be free of projections and low on notch effects, and a coupling element detachably connected to the at least one end of each metallic tubular body of the first and second traction rods in absence of a material connection therebetween, with the coupling element of the first traction rod constructed for articulated connection to the coupling element of the second traction rod with a bolt extending transversely through openings in both the coupling element of the first traction rod and the coupling element of the second traction rod, wherein the at least one end with the wall thickening is dimensioned such that a fatigue strength corresponds to a calculated full load capacity of the tube cross-section.

2. The articulated connection of claim 1, wherein the full load capacity of the tubular body is calculated based on a nominal wall thickness of the tube cross-section, wherein a region of the wall thickening comprises an exterior thread, wherein the wall thickening is dimensioned so as to prevent the exterior thread from weakening the nominal wall thickness in the connection region.

3. The articulated connection of claim 2, wherein the detachable connection is a screw connection, with the coupling element comprises in the connection region an interior thread that mates with the exterior thread.

4. The articulated connection of claim 1, wherein the unitary transition region forms a shoulder, wherein the coupling element formfittingly abuts the unitary transition region for transmitting a pulling force, wherein the coupling element at an end of the first traction rod is constructed as a father element and the coupling element at an end of the second traction rod is constructed as a mother element, wherein the father element of the first traction rod is configured for insertion into the mother element of the second traction rod in an overlap region and for articulated connection with a bolt in the overlap region.

5. The articulated connection of claim 4, wherein the coupling element is symmetrically split into two shells in relation to a longitudinal axis of the tubular body, with the two shells being connected with one another for attachment on the tubular body.

6. The articulated connection of claim 2, wherein the wall thickening is produced by hot upsetting.

7. The articulated connection of claim 2, wherein the wall thickening is produced from an overlay weld.

* * * * *